UNITED STATES PATENT OFFICE.

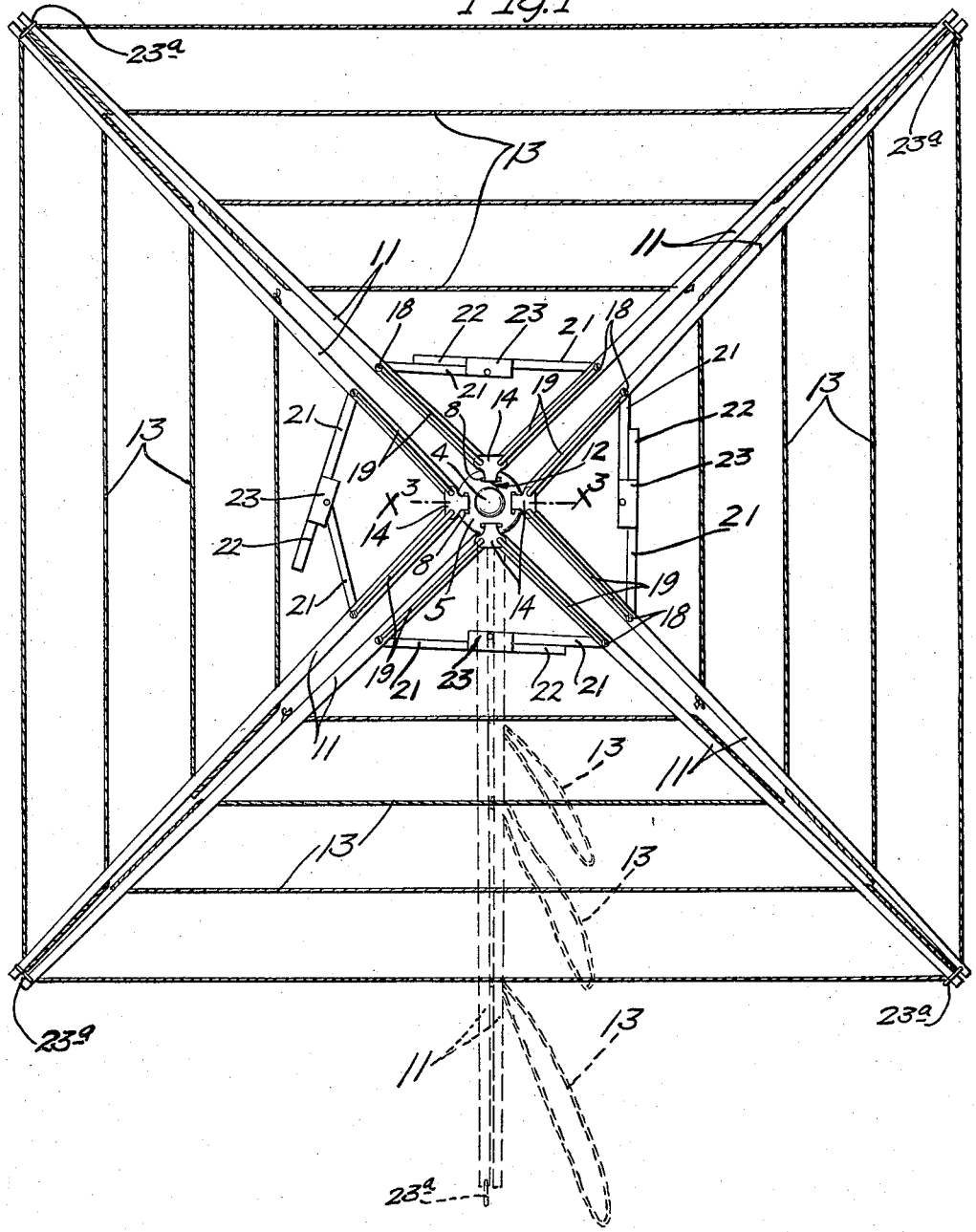

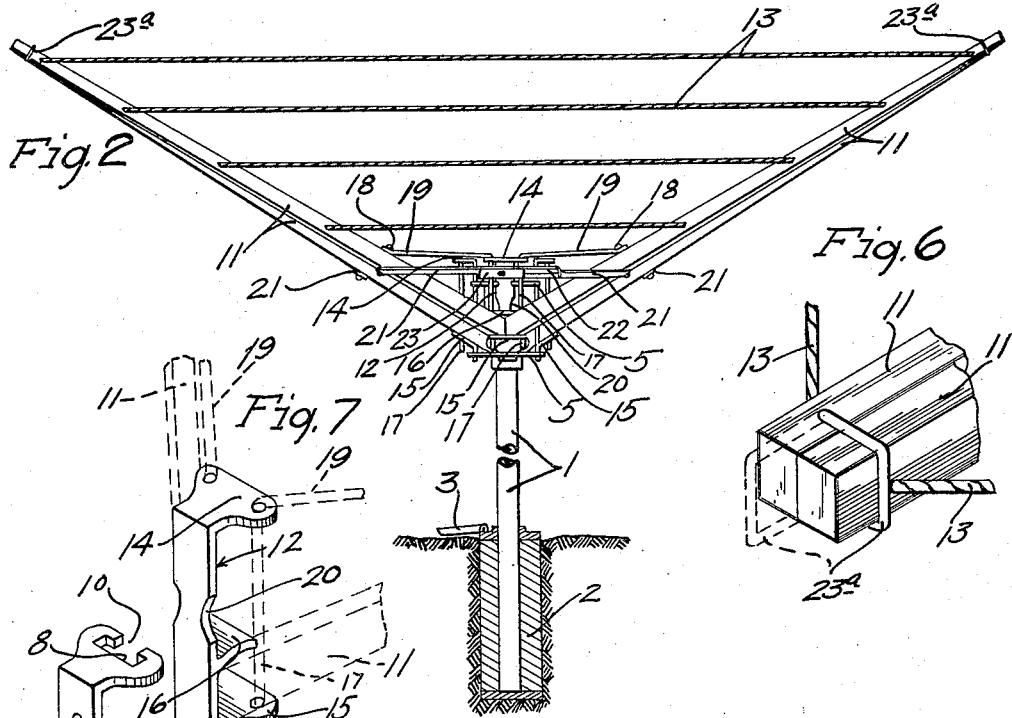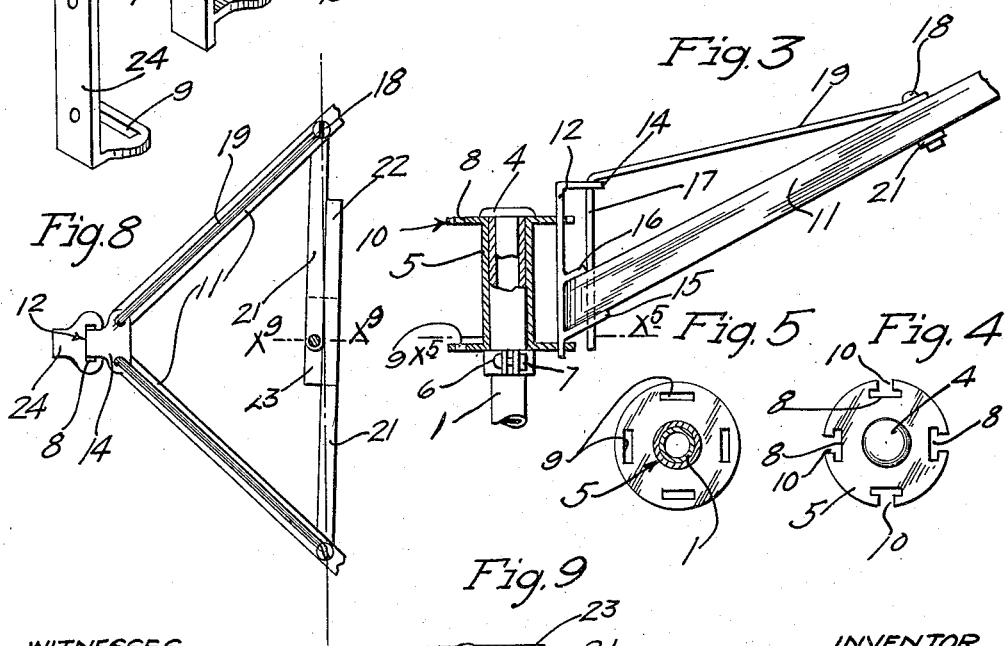

ROY N. HOLMES, OF MINNEAPOLIS, MINNESOTA, ASSIGNOR TO THE ADVANCE MANUFACTURING COMPANY, OF MINNEAPOLIS, MINNESOTA, A CORPORATION OF MINNESOTA.

CLOTHES-DRIER.

1,149,766.        Specification of Letters Patent.        Patented Aug. 10, 1915.

Application filed December 7, 1914. Serial No. 875,815.

*To all whom it may concern:*

Be it known that I, ROY N. HOLMES, a citizen of the United States, residing at Minneapolis, in the county of Hennepin and State of Minnesota, have invented certain new and useful Improvements in Clothes-Driers; and I do hereby declare the following to be a full, clear, and exact description of the invention, such as will enable others skilled in the art to which it appertains to make and use the same.

My present invention is in the nature of an improvement or modification of my copending application entitled Clothes drier, filed April 27th, 1914, under S. N. 834,568, and matured into Patent 1,122,276, December 29, 1914.

To the above end the invention consists of the novel devices and combinations of devices hereinafter described and defined in the claims.

In the accompanying drawings, which illustrate the invention, like characters indicate like parts throughout the several views.

Referring to the drawings, Figure 1 is a plan view of the improved clothes drier, some parts being indicated in different positions by means of dotted lines; Fig. 2 is a view principally in side elevation, some parts being broken away and some parts being shown in central vertical section; Fig. 3 is a detail view partly in side elevation and partly in vertical section taken on the line $X^3$ $X^3$ of Fig. 1, some parts being broken away; Fig. 4 is a plan view of the reel head; Fig. 5 is a transverse section taken on the line $X^5$ $X^5$ of Fig. 3; Fig. 6 is a fragmentary perspective view of the outer ends of an adjacent pair of line supporting arms, on an enlarged scale; Fig. 7 is a perspective view of one of the reel sections removed from the reel head and in position to be applied to a wall bracket, some parts being indicated by means of dotted lines; Fig. 8 is a plan view of one of the reel sections removed from the reel head and supported on the wall bracket; and Fig. 9 is a detail view in section, taken on the line $X^9$ $X^9$ of Fig. 8 on an enlarged scale.

The numeral 1 indicates an upright tubular post removably supported at its lower end in a socket 2 said socket being embedded in the ground with its upper end substantially flush therewith. This socket 2 is provided with a hinged cover 3 to prevent said socket from filling up with dirt, ice or snow, when the post 1 is removed therefrom. Driven into the upper end of the post 1 is a heavy pin 4 having a head materially larger than the diameter of the post 1.

Journaled on the post 1 is a reel head 5 in the form of a spool cast from a single piece of metal, having a tubular body through which the post 1 projects. This reel head 5 is supported on the post 1 directly under the head of the pin 4 by a split clamping collar 6, said collar 6 being frictionally clamped on to the post 1 by a draw bolt 7. The ends of the split collar 6 are bent laterally outward and perforated to receive the draw bolt 7. Obviously the clamping collar 6 may be vertically adjusted on the post 1 to bring the reel head 5 into its proper relation with the head of the pin 4. This head of pin 4 prevents the reel head 5 from being lifted bodily from the post 1, either by the wind or otherwise.

Formed in the upper and lower flanges of the reel head 5 is a plurality of pairs of circumferentially spaced upper and lower seats 8 and 9 respectively. As shown, these seats are in the form of rectangular openings in said flanges, and the seats 8 are provided with entrance passages 10 which extend from the periphery of the respective flange into the seats 8.

The body of the reel comprises a plurality of pairs of arms 11, arm supporting brackets 12, and clothes lines 13, each of the brackets 12 has integrally formed therewith vertically spaced upper, lower and intermediate lugs 14, 15 and 16 respectively. To each bracket 12 is secured a pair of the arms 11. The inner ends of these arms are inserted between the lugs 15 and 16 and they are pivoted independently to the lugs 14 and 15 by hinge rods 17 passed through alined perforations in said lugs 14 and 15. As best shown in Fig. 3 the lugs 15 and 16 are upwardly and outwardly inclined so as to support the arms 11 in like positions. It will be noted that the lugs 16 terminate short of the hinge rods 17 and are provided simply to hold the arms 11 seated on the lugs 15. In actual practice the arms 11 will be loosely mounted between the lugs 15 and 16 for horizontal swinging movement toward and from each other. The upper ends of the hinge rods 17 are bent, laterally forward and anchored to the respective arms 11 by nut equipped bolts 18, to afford braces 19 for said arms. Obviously these braces 19 prevent the arms 11 from sagging and at the same time permit free horizontal swinging movements thereof.

One of the clothes lines 13 is secured to each pair of arms 11 and is extended back and forth between said arms to give the maximum capacity to each pair of said arms. Each pair of arms 11 is independently, detachably and interchangeably supported from the reel head by its respective bracket 12 mounted in any one pair of the seats 8—9.

To permit the brackets 12 to be applied or removed from the reel head, the bodies thereof are contracted at 20 to permit said brackets to be moved laterally through the entrance passages 10 in to or out of the seats 8. A downward movement of the brackets 12 in the seats 8 will carry their lower end portions into the seats 9 and their contracted portions 20 out of alinement with the entrance passages 10, thus locking said brackets to the reel head. The lugs 15 are spaced above the lower ends of the brackets 12 and afford stops to limit the downward movement of said brackets in the reel head.

To each pair of arms 11 is secured a toggle which affords a spreader 21, to hold respective arms 11 open and the attached clothes line drawn tight. The outer or free ends of the spreader 21 are attached to the arms 11 by the bolts 18 which also attach the braces 19 thereto. The joints of the spreaders 21 are adapted to be moved inward past dead centers, as best shown in Fig. 8, to thereby lock said spreaders in operative position. The inner end of one of the sections of each spreader 21 is extended and bent laterally downward to afford a hand lever 22 by which the respective spreader may be moved to and from operative positions. The sections of each spreader 21 are offset edgewise from each other, located in the same horizontal plane, and the section having the lever extension 22 has rigidly secured thereto a pair of laterally spaced plates 23 between which the other section of the respective spreader is pivotally mounted.

The lever extensions 22, when the toggles are straightened, afford stops to limit the inward folding movement of the toggles. As shown in Fig. 3 the spreaders 21 are located on the under side of the arms 11, and when said arms are folded the sections of the spreaders 21 fold directly under the arms 11 to which they are pivotally secured. By this arrangement the arms 11 may be folded into very compact form.

To the outer end of one of the arms 11 of each pair is pivotally secured a lock loop 23ª, adapted to be turned into a position to embrace the outer end of the adjacent arm of the adjoining reel section, as best shown in Fig. 6. These lock loops 23, when turned into operative positions, lock all of the reel sections together, as shown in Fig. 1.

A wall bracket 24 is provided for independently and removably supporting the reel sections in a room or laundry while the clothes are being pinned on the clothes lines 13. This wall bracket 24 is provided with upper and lower seats, which are identical with the respective seats 8 and 9 formed in the reel head 5, and may be secured by screws to a door or window casing or any other convenient place. After one of the reel sections has been applied to the wall bracket 24 the spreader 21 is straightened to hold the arms 11 open, to permit the wet clothes to be pinned on to the clothes line. When the clothes have been pinned on the line the spreader 21 is buckled, the arms 11 folded and the reel section lifted from the wall bracket 24, and carried out doors and mounted on the reel head 5. The spreader 21 is then again straightened to spread the arms. In mounting the first three reel sections on the reel head 5, the spreaders 21 may be straightened while standing at one side of the reel sections. To straighten the spreader 21 of the fourth or last reel section applied to the reel head 5, it would be necessary to pass under the wet clothes. To avoid this the said spreader may be left open as shown in Fig. 1, and the arms of the respective reel section held open simply by the use of the lock loops 23.

The above described device, will be found highly efficient for use in cold and inclement weather, whereby the clothes may be pinned onto the reel sections in the house, and then carried out and placed in position on the reel head, to dry. After the clothes are dry, the reel sections may again be carried into the house, one at a time, mounted on the wall bracket, and the clothes removed. As is well known, considerable damage is usually done to the clothes in the winter-time in removing the same from the line when frozen. By the use of the improved drier, the clothes may remain on the reel sections in the house a sufficient length of time to permit the same to thaw, before being removed from the clothes line.

What I claim is:

1. In a clothes drier, the combination with a bracket having vertically spaced upper and lower lugs, of a line supporting arm, and a rod securing said arm to the lugs of said bracket, one end of said rod being bent laterally and secured to said arm to afford a brace therefor.

2. In a clothes drier, the combination with a bracket having vertically spaced upper and lower lugs, of a line supporting arm, and a rod pivotally securing said arm to the lugs of said bracket for horizontal swinging movement, the upper end of said rod being bent laterally and secured to the intermediate portion of said arm to afford a brace therefor.

3. In a clothes drier, the combination with a bracket having vertically spaced upper, lower and intermediate lugs, of a line supporting arm having its inner end mounted between the lower and intermediate lugs of said bracket, and a rod passed through the upper and lower lugs of said bracket and through said arm, for securing said arm to said bracket with freedom for horizontal swinging movement, the upper end of said rod being bent laterally and secured to the intermediate portion of said arm, to afford a brace therefor.

4. In a clothes drier, the combination with a bracket having vertically spaced upper and lower lugs, of a line supporting arms having its inner end extended between the upper and lower lugs of said bracket, a rod passed through said lugs and arm for securing said arm to said bracket with freedom for horizontal swinging movement, the upper end of said rod being bent laterally and secured to the intermediate portion of said arm, to afford a brace therefor, and an intermediate lug on said bracket for holding the inner end of said arm seated on the lower lug of said bracket.

5. In a clothes drier, the combination with a bracket, of a pair of line supporting arms secured to said bracket, at least one of said arms being hinged to said bracket for folding movement toward and from the other of said arms, and a toggle connecting said arms and acting as a spreader therefor.

6. In a clothes drier, the combination with a bracket, of a pair of folding arms secured to said bracket, and a toggle connecting said arms and acting as a spreader therefor, the outer ends of said toggle being pivotally connected, one to each of said arms, and the joint of said toggle arranged to be moved beyond a dead center for locking said arms spread.

7. In a clothes drier, the combination with a bracket, of a pair of folding arms, rods pivotally securing the inner ends of said arms to said bracket with freedom for horizontal movements, the upper ends of said rods being bent laterally and secured to the intermediate portions of said arms, and a toggle connecting said arms and acting as a spreader to hold said arms open, the outer ends of said spreader being secured to said arms by the same means that secures said braces thereto.

8. In a clothes drier, the combination with a post, of a reel head in the form of a spool, having a tubular body journaled on said post, a plurality of circumferentially spaced seats, formed in the flanges of said reel head, and a plurality of arm supporting brackets interchangeably and removably seated in said seats.

In testimony whereof I affix my signature in presence of two witnesses.

ROY N. HOLMES.

Witnesses:
J. C. IVERSON,
HARRY D. KILGORE.

Copies of this patent may be obtained for five cents each, by addressing the "Commissioner of Patents, Washington, D. C."